United States Patent
Pauliukonis

[15] 3,680,582
[45] Aug. 1, 1972

[54] QUICK EXHAUST VALVE
[72] Inventor: Richard S. Pauliukonis, 6660 Greenbriar Dr., Cleveland, Ohio 44130
[22] Filed: Feb. 16, 1970
[21] Appl. No.: 11,621

[52] U.S. Cl. ............................. 137/102, 251/DIG. 1
[51] Int. Cl. .................................................. G05d 7/00
[58] Field of Search ........... 137/102, 525; 251/DIG. 1

[56] References Cited

UNITED STATES PATENTS

| | | | |
|---|---|---|---|
| 2,703,558 | 3/1955 | Wilcox | 137/525 X |
| 2,716,997 | 9/1955 | Crookston | 137/102 |
| 3,093,153 | 6/1963 | Horowitz | 137/102 |
| 3,216,451 | 11/1965 | Smallpeice | 251/DIG. 1 |

FOREIGN PATENTS OR APPLICATIONS

| | | | |
|---|---|---|---|
| 839,642 | 6/1960 | Great Britain | 137/102 |
| 1,003,614 | 9/1965 | Great Britain | 137/102 |

*Primary Examiner*—Samuel B. Rothberg
*Assistant Examiner*—David J. Zobkiw

[57] ABSTRACT

A valve for transmitting pressurized fluid from a fluid supply to receiver means, such as an actuating power cylinder, and for exhausting the transmitted fluid when the pressure of the fluid supply drops, comprises a check valve carrying an elastomer seal, the seal being moved in a direction to cover exhaust port means and to admit fluid through the valve during fluid infeed, and to be returned by the back pressure to cover the infeed means when the pressure of the fluid supply drops permitting cylinder exhaust. An O-ring positioned interiorly of the valve body is employed to act as a check valve seal.

5 Claims, 2 Drawing Figures

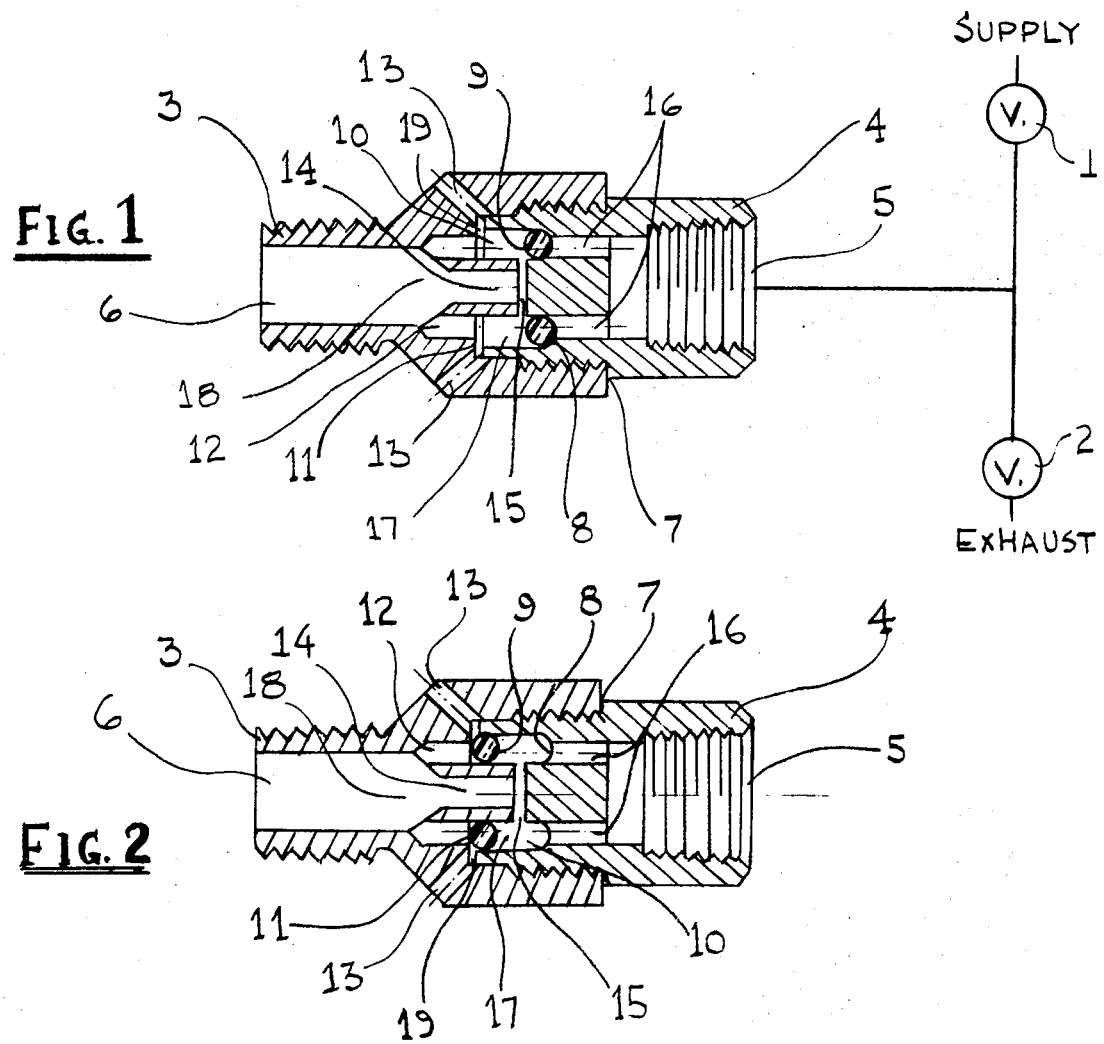

QUICK EXHAUST VALVE

The present invention provides a valve for transmitting pressurized fluid from a fluid supply to receiver means such as an actuating power cylinder, and for exhausting the transmitted fluid when the pressure of the fluid supply drops. It is obviously desirable to provide valves of this type which are simple in design, reliable and inexpensive. It is also desirable that such valves cause a minimum drop in pressure of the incoming pressurized fluid in order to ascertain maximum utilization of the available pressure energy for useful work such as moving the piston in the actuating power cylinder.

The present invention provides valves of this general type which are simple in design, and hence low in cost and reliable in operation. One aspect of the invention makes possible a significant reduction in the amount of pressure drop that occurs in the transmission of pressurized fluid through the valve.

These and other objects and advantages of the invention will become more fully apparent from the following description on an embodiment of the invention, taken together with the accompanying drawings.

In the drawings,

FIG. 1 is a cross-sectional view of a valve embodying the invention, combined with a schematic sketch showing how a supply-exhaust circuit might be associated with the valve.

FIG. 2 is a view similar to the cross-sectional portion of FIG. 1 showing the seal-ring in a different position.

Shown in FIG. 1 is a valve body 7 having an infeed end 4 and a receiver end 3. At the infeed end, the port 5 is connected to a fluid supply system which in illustrated case includes a valve 1 leading from a fluid supply source and a valve 2 leading to a fluid exhaust. With the valve 1 open and valve 2 closed, the port 5 is subject to the full pressure of the fluid supply. With the valve 1 closed and the valve 2 open, the port 5 experiences a drop in the fluid supply pressure down to substantially atmospheric pressure.

The port 6 may be connected to a pneumatic actuating power cylinder (not shown). The operation of the illustrated valve 7 is such that when the valve 1 is open and the valve 2 is closed the pneumatic actuating power cylinder will receive pressurized air and will fill and maintain line pressure until such time as pressure in the supply line drops, where upon pressure in the actuating power cylinder is immediately relieved through the openings of the valve 7.

The valve housing 7 is formed by the open ended members 3 and 4 which are threaded together forming an annular space for an elastomer ring-seal 9 that is slidingly received in the interior of the valve housing 7. Shoulders 8 and 11 of the annular interior 10 form end stops for the sliding axial motion of the elastomer ring-seal 9. The interior 10 comprises bores and flow passages within the body 7.

The elastomer ring-seal 9 divides the opposed ends of the interior 10 into an infeed chamber 17 and a receiver chamber 18.

The infeed chamber 17 includes a multiplicity of holes 16 spaced axially on shoulder 8 of the interior of member 4 for communication between infeed chamber 17 and infeed port 5. Central passage means 15 midway between the open ended members 3 and 4 permit flow communication via open centered intake orifice 14 with receiver port 6. The intake orifice 14 forms a part of the receiver chamber 18.

The receiver chamber 18 includes the axially spaced passageways 12 distributed around the shoulder 11 of the annular interior of open ended member 3 for communication between receiver port 6 and annular gap 19, and the passage means 13 entering the valve interior at an angle and communicating through gap 19 with passageways 12, the passageways 12 and the passage means 13 comprising the fluid exhaust means. Exhaust passageways 12 and orifice 14 are in axial relationship to each other, except for length and the amount of net fluid flow area, the orifice always longer than the exhaust passageways 12 and less in net fluid flow area, thus offering more resistance to the fluid flow during exhaust.

A floating elastomer ring-seal 9 moving axially inside the interior 10 against shoulders 8 and 11 acts as a check valve. When valve 1 is open and valve 2 is closed, the pressurized fluid entering infeed chamber 17 will force the ring-seal 9 against the shoulder 11 blocking off passageways 12 including passage means 13, and allowing flow of the fluid from infeed chamber 17 to go, via passage 15 and orifice 14, to receiver port 6 for cylinder actuation, and not vice- versa. This is possible because of the pressure drop between the infeed chamber 17 and the receiver port 6, caused by the directional changes and restrictions of the flow passing via passage 15 and intake orifice 14, and a pressure in the infeed chamber always higher than the pressure in the receiver port. The infeed chamber 17 always sensing higher fluid pressure than that in the receiver port 6 will maintain the seal ring 9 against the passageways 12 including passage means 13 and will result in unidirectional fluid flow from infeed port 5 through infeed chamber 17 via central passage 15 and orifice 14 into receiver port 6 for cylinder feeding and actuation.

When the valve 1 is closed and the valve 2 is open, the pressure in the intake chamber drops below that of the pressure in the receiver port causing the seal ring to move quickly back against shoulder 8. As a result of lower pressure drop through the passageways 12 than that through the orifice 14, the ring-seal 9 is actually forced by the higher pressure stream from the passageways 12 against lower pressure region, in infeed chamber 17 end, at shoulder 8, permitting an unidirectional cylinder exhaust via passage means 13 which now are open to atmosphere due to the change of direction of floating ring-seal 9.

The members 4 and 3 with the floating elastomer ring-seal 9 inside an annular space 10 divided into an infeed and receiver chambers for alternative cylinder feeding and exhaust comprises an ultimate simplicity in the design of quick exhaust valves.

The invention is not restricted to the slavish imitation of each and everyone of the details described above which have been set forth merely by way of example with the intent of most clearly setting forth the teaching of the invention. Obviously, devices may be provided which change, eliminate or add certain specific structural or procedural details without departing from the invention.

What is claimed is:

1. A valve for transmitting pressurized fluid from supply to receiver means such as an actuating power cylinder, and for exhausting the transmitted fluid when the pressure of the fluid supply drops, comprising a valve housing having an infeed end and a receiver end, an annular chamber within said housing, said annular chamber having opposed first and second ends associated respectively with said infeed end and said receiver end, an elastomeric sealing ring slidable within said housing back and forth between first and second positions in which the ring is seated at the first and second ends of the annular chamber, feed passage means connecting said infeed end with first port means formed at said first end of the annular chamber, exhaust passage means connecting said receiver end with second port means formed at said second end of the annular chamber, vent passage means connecting a vent outlet with third port means also formed at said second end of the annular chamber, and intake passage means connecting said receiver end with fourth port means formed intermediate said first and second ends of the annular chamber.

2. Device as in claim 1 in which the valve housing comprises endwardly engaged male and female fittings, and the first and second ends of the annular chamber are formed in opposed bores in the fittings.

3. Device as in claim 1 in which the valve housing comprises endwardly engaged male and female fittings, and the third and fourth port means are each formed by gaps between axially facing parts of said fittings.

4. Device as in claim 1 in which the valve housing comprises endwardly engaged male and female fittings, and the feed passage means and the exhaust passage means comprise passages drilled in one or the other of said fittings parallel to the axis thereof.

5. A valve for transmitting pressurized fluid from supply to receiver means such as an actuating power cylinder, and for exhausting the transmitted fluid when the pressure of the fluid supply drops, comprising a valve housing having an infeed end and a receiver end, and including two endwardly engaged fittings, an annular chamber within said housing, said annular chamber having opposed first and second ends associated respectively with said infeed end and said receiver end, an elastomeric sealing ring slidable within said housing back and forth between first and second positions in which the ring is seated at the first and second ends of the annular chamber, central coaxial stubs formed in each of said fittings and together defining a central core of said annular chamber which central core receives the inside diameter of said sealing ring, a gap between the ends of the stubs forming a port to said annular chamber intermediate the ends thereof, intake passage means within one of said stubs and connecting said gap with said receiver end of the valve housing, and additional passage and port means for connecting said first end of the annular chamber to said infeed end of the valve housing and for separately connecting said second end of the annular chamber respectively to a vent and to said receiver end of the valve housing.

* * * * *